March 2, 1965     E. E. ELROD     3,171,347
PAPER STORAGE BOX AND BALER
Filed Aug. 22, 1963
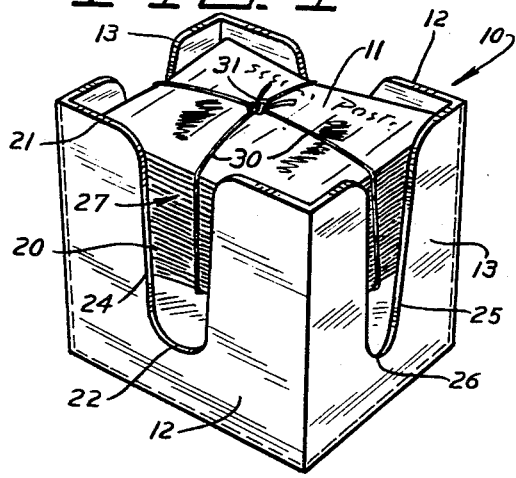
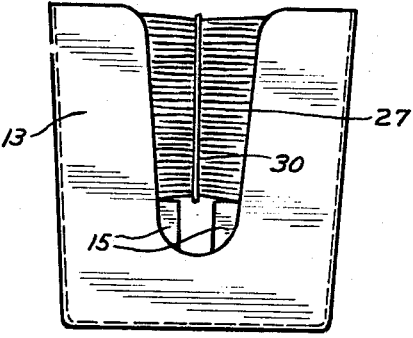
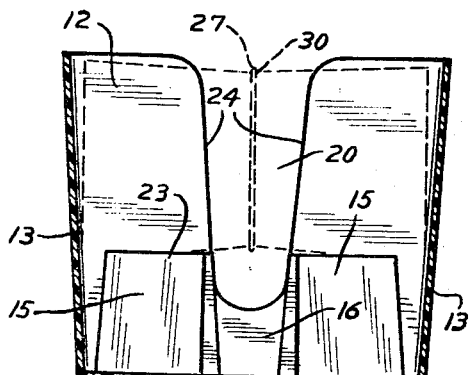
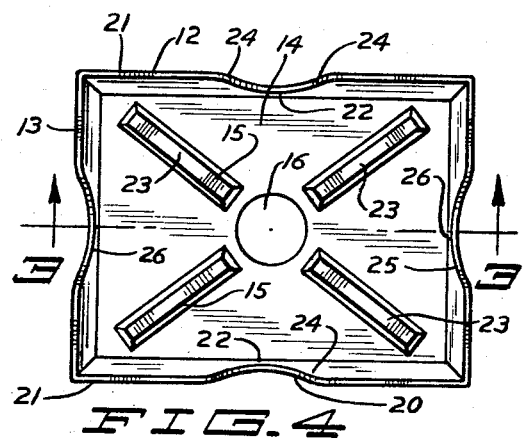
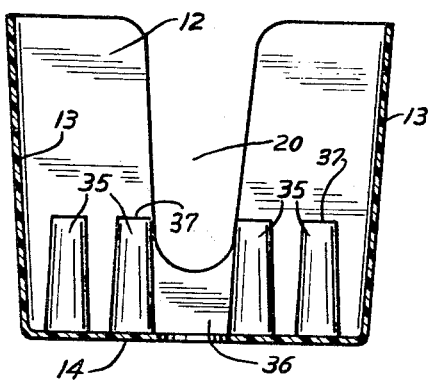
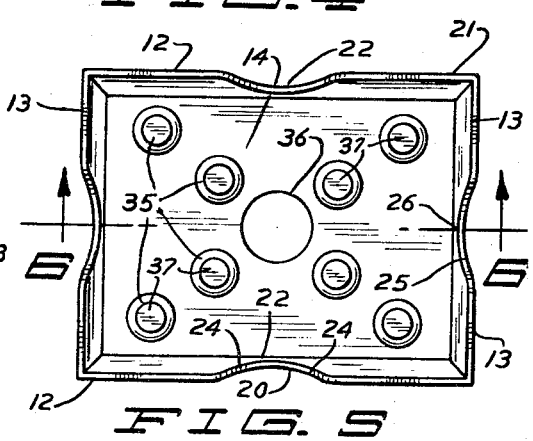
INVENTOR.
EVERETTE E. ELROD
BY
Dugger, Braddock, Johnson + Westman
ATTORNEYS United States Patent Office 3,171,347
Patented Mar. 2, 1965

3,171,347
PAPER STORAGE BOX AND BALER
Everette E. Elrod, 5080 Rainbow Lane,
New Brighton, Minn.
Filed Aug. 22, 1963, Ser. No. 303,797
6 Claims. (Cl. 100—1)

The present invention has relation to a storage box for papers and more particularly to a unique storage box for papers which will keep the paper oriented to make a neat bale and has provisions for wrapping twine around the bale within the box.

The problem of handling newspapers, in particular, and other papers, in general, in the home has long been present. The stacks of papers in the basement are usually unsightly, irregularly arranged, and certainly do not add to the appearance of the home.

Some attempts have been made to develop boxes for storing newspaper which will keep the papers arranged and also will serve to support the papers so that they can be baled with twine. However, the previous attempts to make such boxes have not met with commercial success largely due to the fact that the items are fairly expensive to build. There have been no paper boxes advanced which will adapt themselves to molding from suitable plastic materials and thus, become a high production, low cost item available to even the most modest of households.

The present invention presents a paper box which has a unique support mechanism therein for supporting a bale or stack of papers thereon. The support mechanism enables a person to insert twine beneath a stack of papers in the box and bale the papers into neat storage bales. The box is provided with side openings to permit the easy insertion and removal of the hands during the baling and tieing operation. Further, the support mechanism in the box itself is designed to enable the manufacturer to make the box from a plastic in a very simple molding operation. Thus, the unit can become a high production, low cost item. A great deal of money is not necessary to manufacture molds for the box. The unit can be made in a variety of colors to suit the decor of any home and actually enhance the appearance of the home.

Further, the side openings of the box are continuous from the top thereof to adjacent the bottom not only to permit insertion of the twine during the baling of the stack of papers in the box but also to permit the easy removal of the bale after it has been tied. The box has four sides which hold the stack securely and do not permit papers to slide off the top of the stack, as some open sided boxes have in the past. The paper is kept in a neat stack while the box is being filled.

It is an object of the present invention to present a newspaper box which includes support members positioned to permit easy baling of the papers stored therein and to present a configuration adapted to high production plastic molding.

In the drawings:

FIG. 1 is a perspective view of a paper storage box made according to the present invention;

FIG. 2 is an end elevational view of the device of FIG. 1;

FIG. 3 is a sectional view of the device of FIG. 1 taken as on line 3—3 in FIG. 4;

FIG. 4 is a top plan view of the device in FIG. 1;

FIG. 5 is a top plan view of a modified form of the device of FIG. 4 illustrating a different configuration of the support members in the bottom of the box; and FIG. 6 is a sectional view taken as on line 6—6 in FIG. 5.

Referring to the drawings and the numerals of reference thereon, a paper storage box illustrated generally at 10 is comprised as a rectangular spaded box of a size to receive a stack of newspapers 11 and has a pair of substantially parallel spaced side walls or panels 12, 12 and a pair of end walls or panels 13, 13 spaced apart and joined to opposite ends of the side walls 12, 12 and extending between the side walls. The walls in turn are attached to the bottom of panel 14. As shown in the first form of the invention, a plurality of upright support members 15 are integral with the floor panel 14 and extend upwardly from the floor panel a substantial distance. The support members 15 are arranged, as shown, diagonally from the junction corners of side walls 12 and end walls 13 and are spaced apart at the center portion 16 of the bottom panel.

The individual support members are tapered as shown to permit easy molding and may be hollowed out from the bottom of the floor panel 14 in order to cut down the weight and cost of molding from plastic. Also, as will be seen, the side and end panels 12 and 13 taper upwardly and outwardly from the bottom panel 14.

Each of the side panels 12 is provided with an elongated opening 20 which extends from the top edge 21 of the side panel downwardly and terminates along a radius portion 22 which is spaced above the floor 14 and below plane defined by the top edges 23 of the support members 15. The openings 20 are of substantial size, as can be seen. The bounding edges 24, 24 of each of the openings taper in an outwardly and upwardly direction.

The end panels 13, 13 each have an opening 25 defined therein which is substantially the same size and configuration as the openings 20 in the side panels 12. The openings 25 have bottom curved edge surfaces 26 which are positioned above the floor panels 14 and below the plane defined by the top edges 23 of the supports 15.

The box can be placed in the basement, garage or room of the home and the papers 11 placed into the box until a sizable stack 27 has been accumulated. At that time the stack can be made into a bundle or bale of papers by passing a piece of twine 30 through the aligned openings 20 on the side walls and wrapping it around the stack and also passing the twine through the openings 25 of the end walls and tieing the twine as at 31 at the top of the bale.

It will be noted that the plane defined by the top edges 23 of the supports 15 is a sufficient distance above the bottom edges 22 and 26 of the openings 20 and 25, respectively, to permit the passage of a human hand underneath the paper bale so that the twine can be wrapped around the bale without any difficulty. Further, the open space or area 16 between the upright supports is large enough to permit the twine to pass between the supports in either the longitudinal or transverse direction of the box.

When the bale of newspapers has been secured, it can be removed by inserting the hands through two of the aligned openings and lifting the bale upwardly. The tapered side panels of the box permit the bale to be removed easily as well as aiding in the molding operation. Further the tapered side panels permit the boxes to be nested for storage.

In FIGS. 5 and 6 a second form of the invention is shown. The second form also utilizes side panels 12, 12 and end panels 13, 13 with their openings as previously described. However, the supports on the bottom panel 14 of this box are of a different configuration. As can be seen, a plurality of supports 35 are molded integral with the bottom panel 14. The supports are substantially upright columns that taper from the bottom toward the top thereof and are arranged in a X-configuration as the supports 15 were. However, the columns 35 are arranged in rows and continuous support is not provided.

The top end surfaces 37 of columns 35 define a plane that is positioned in the same relative position as the plane defined by the surfaces 23 of support members 15 with respect to the bottom panel.

It will be seen that a center clear space or area 36 is also provided in the second form of the invention so that the hand and the ball of string or twine can be passed between these supports through the center thereof to aid in the baling operation of the newspapers.

The columns 35 are also easy to mold and may be hollowed out partially from the bottom panel 14 to decrease the weight of the box and to cut the cost of material in manufacturing the box.

In this form of the invention, the papers are baled in the same manner as in the first form of the invention.

Either form of the invention will permit the storage of papers in an attractive box and arranged so that they can be baled with a minimum of effort.

What is claimed is:

1. A box for holding paper comprising a continuous bottom panel, a plurality of side wall panels and a pair of end wall panels, each attached to said bottom panel and to each other at adjoining corners thereof, a plurality of tapered upright column-like support members integral with said bottom panel and extending upwardly in the direction of extension of said wall panels and being spaced from the wall panels, said support members having top surfaces lying in a common plane spaced above the bottom panel, an elongated opening provided in each of said wall panels extending from the top edge thereof to position below the plane in which the top surfaces of said support members lie, said wall openings being of size to permit a human hand to pass therethrough and below said plane.

2. The combination as specified in claim 1 wherein said support members are spaced apart at the center portions of said box a distance sufficient to permit a hand to pass therebetween.

3. The combination as specified in claim 2 wherein said support members are comprised as four individual members integral with said bottom panel, said members being rectangularly shaped and each extending from position adjacent one corner of said box in direction diagonally toward an opposite corner of said box.

4. The combination as specified in claim 2 wherein said support members comprise a plurality of columns having a circular cross section.

5. The combination as specified in claim 4 wherein said support members and said side walls are tapered a sufficient amount and in proper direction to permit said box to be manufactured with a two part mold.

6. The combination as specified in claim 2 wherein said support members are positioned so that the space between said support members at the center of the box are aligned with openings in opposite walls.

References Cited in the file of this patent
UNITED STATES PATENTS

| | | |
|---|---|---|
| 2,521,126 | Price | Sept. 5, 1950 |
| 2,599,290 | Schwenzer | June 3, 1952 |
| 2,639,037 | Friend | May 19, 1953 |
| 2,818,180 | Keene | Dec. 31, 1957 |
| 2,850,197 | Hart | Sept. 2, 1958 |
| 2,965,016 | Price | Dec. 20, 1960 |